United States Patent
Bauer et al.

(10) Patent No.: US 9,644,150 B2
(45) Date of Patent: May 9, 2017

(54) METHOD OF THERMOLYZING BIOMASS IN PRESENCE OF HYDROGEN SULFIDE

(71) Applicant: KiOR, LLC, Pasadena, TX (US)

(72) Inventors: Lorenz J. Bauer, Pasadena, TX (US); Mitch Loescher, Seabrook, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 0 days.

(21) Appl. No.: 14/970,406

(22) Filed: Dec. 15, 2015

(65) Prior Publication Data

US 2016/0177185 A1  Jun. 23, 2016

Related U.S. Application Data

(60) Provisional application No. 62/093,861, filed on Dec. 18, 2014.

(51) Int. Cl.

| | |
|---|---|
| *C07C 1/00* | (2006.01) |
| *C10G 1/00* | (2006.01) |
| *C10G 1/02* | (2006.01) |
| *C10B 49/22* | (2006.01) |
| *C10B 53/02* | (2006.01) |
| *C10B 57/06* | (2006.01) |
| *C10G 3/00* | (2006.01) |
| *C10G 1/06* | (2006.01) |
| *C10G 1/08* | (2006.01) |

(52) U.S. Cl.
CPC .............. *C10G 1/02* (2013.01); *C10B 49/22* (2013.01); *C10B 53/02* (2013.01); *C10B 57/06* (2013.01); *C10G 1/06* (2013.01); *C10G 1/08* (2013.01); *C10G 3/49* (2013.01); *C10G 3/50* (2013.01); *C10G 3/52* (2013.01); *Y02E 50/14* (2013.01)

(58) Field of Classification Search
CPC .................................. C01C 1/00; C10G 1/00
USPC ........................................ 585/240, 241, 242
See application file for complete search history.

(56) References Cited

U.S. PATENT DOCUMENTS

| | | |
|---|---|---|
| 2,492,335 A | 12/1949 | Chenicek |
| 2,648,691 A | 8/1953 | Thompson |
| 4,094,765 A | 6/1978 | Bearden et al. |
| 4,490,566 A | 12/1984 | Chang |
| 7,901,568 B2 | 3/2011 | O'Connor |
| 8,557,193 B2 | 10/2013 | Bartek et al. |
| 9,051,525 B2 | 6/2015 | Trewella et al. |
| 9,200,209 B2 | 12/2015 | Trewella et al. |
| 9,290,423 B2 | 3/2016 | Trewella et al. |
| 9,303,213 B2 | 4/2016 | Lin et al. |

(Continued)

FOREIGN PATENT DOCUMENTS

| | | |
|---|---|---|
| WO | 2010088486 | 8/2010 |
| WO | 2010101686 | 9/2010 |

OTHER PUBLICATIONS

International Search Report dated Mar. 31, 2016 from PCT/US2015/065900.

*Primary Examiner* — Thuan D Dang
(74) *Attorney, Agent, or Firm* — John Wilson Jones; Jones Delflache LLP

(57) ABSTRACT

The amount of renewable hydrocarbons produced from biomass may be increased by pyrolyzing the biomass in a biomass conversion unit in the presence of hydrogen sulfide or a sulfiding agent. The formation of deposits of unwanted carbonaceous materials, such as coke, is reduced by the presence of the hydrogen sulfide or sulfiding agent.

31 Claims, 5 Drawing Sheets

(56) References Cited

U.S. PATENT DOCUMENTS

| | | |
|---|---|---|
| 2009/0193709 A1 | 8/2009 | Marker et al. |
| 2010/0287821 A9* | 11/2010 | Myllyoja ............... C10G 45/64 44/308 |
| 2011/0174597 A1 | 7/2011 | Bartek et al. |
| 2011/0197511 A1 | 8/2011 | O'Connor |
| 2012/0101319 A1* | 4/2012 | Roberts .................... C10G 3/45 585/240 |
| 2012/0272565 A1 | 11/2012 | Bartek et al. |
| 2013/0029168 A1 | 1/2013 | Trewella et al. |
| 2013/0338414 A1 | 12/2013 | Fingland et al. |
| 2015/0051427 A1 | 2/2015 | Ramirez |
| 2016/0317947 A1 | 11/2016 | Sanchez et al. |

\* cited by examiner

METHOD OF THERMOLYZING BIOMASS IN PRESENCE OF HYDROGEN SULFIDE

This application claims the benefit of U.S. patent application Ser. No. 62/093,861, filed on Dec. 18, 2014, herein incorporated by reference.

FIELD OF THE DISCLOSURE

The disclosure relates to a process for increasing the yield of liquid hydrocarbons from biomass in a biomass conversion system by the addition of hydrogen sulfide or a sulfiding agent to a biomass conversion unit.

BACKGROUND OF THE DISCLOSURE

Renewable energy sources, such as biofuels, provide a substitute for fossil fuels and a means of reducing dependence on petroleum oil. In light of its low cost and wide availability, biomass is often used as a feedstock. Biofuels are typically produced by subjecting the biomass to thermolysis such as, for example, by slow pyrolysis, fast pyrolysis, liquefaction, catalytic thermolysis or enzymatic conversion. The liquid product resulting from thermolysis of biomass separates into an aqueous phase and an organic phase. The organic phase is commonly referred to as bio-oil. Bio-oil is relatively soluble in water though a small amount of water may be retained. Bio-oil can be converted to liquid hydrocarbon fuels. It is desirable to maximize the yield of product boiling between from 80° F. to 1,000° F. Material that boils below 80° F. is considered a light gas. Material boiling above 1000° F. is considered a solid.

Bio-oil typically contains a high level of oxygenates. In order to be converted into renewable hydrocarbons, it is necessary for the bio-oil to be stabilized by removing the oxygen through hydrotreating. This process involves contacting the bio-oil with hydrogen under pressure and at moderate temperatures, generally less than 750° F., over fixed bed reactors. Hydrotreating the bio-oil makes it compatible with petroleum derived refinery streams. In order to stabilize the bio-oil and reduce the amount of hydrogen required in hydrotreating, it is desirable for the bio-oil to have a low oxygen content.

Production of bio-oil in the biomass conversion unit and hydrotreatment of bio-oil typically renders heavy materials and solids which form unwanted carbonaceous deposits, such as coke. These solids reduce the yield of bio-oil and are largely removed from the product after the converted biomass exits the biomass conversion unit. The remaining solids and high boiling material typically plug the biomass conversion unit and catalytic hydrotreating bed and reduce on-stream time. The run length between stoppages in the biomass conversion unit and hydrotreater is therefore often decreased due to the presence of such materials and solids. Methods for reducing the amount of coking in biomass conversion systems have therefore been sought.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improved compositions, systems, apparatus and methods useful in connection with increasing the liquid yields and reducing the deposition of materials which form unwanted carbonaceous deposits in a biomass conversion system having one or more of the attributes or capabilities described or shown in, or as may be apparent from, the other portions of this patent.

SUMMARY OF THE DISCLOSURE

In an embodiment of the disclosure, a process for increasing the yield of liquid hydrocarbons and enhancing deoxygenation during conversion of biomass in a biomass conversion unit is provided. The process involves grinding the biomass into fluidizable particles and combining it with a hot heat transfer material or catalyst and lift gas. In this process biomass and hydrogen sulfide or a sulfiding agent are added to the biomass conversion unit in the lift gas prior to mixing with the heat transfer material or catalyst. The amount of hydrogen sulfide or sulfiding agent in the biomass conversion unit during the process is typically less than or equal to 8,000 parts per million by volume (ppmv) in the lift gas (2.5 weight percent relative to the biomass). The biomass and the hydrogen sulfide or sulfiding agent are then subjected to thermolysis in the biomass conversion unit. Some of the sulfur is thereby incorporated into the biomass. The amount of liquid hydrocarbons produced is greater than when the hydrogen sulfide or sulfiding agent is not added to the biomass conversion unit.

In another embodiment, a process of enhancing the yield of bio-oil by the conversion of solid biomass to hydrocarbons in a biomass conversion unit is provided. In this process, solid biomass and either hydrogen sulfide or a sulfiding agent is subjected to thermolysis in a biomass conversion unit. A fluid phase and a solid phase are separated from the converted biomass. The fluid phase is then separated into a non-condensable gas phase, bio-oil and process water. The bio-oil is then subjected to hydrogenation in a hydrotreater to render renewable hydrocarbons with an oxygen content of less than 2 weight percent. The yield of oil recovered from the hydrotreater is greater than when the hydrogen sulfide or sulfiding agent is not present during treatment of the solid biomass in the biomass conversion unit.

In another embodiment of the disclosure, a process of enhancing the yield of bio-oil from the conversion of solid biomass to hydrocarbons in a biomass conversion unit is provided. In this process, biomass and less than about 4,000 ppm hydrogen sulfide or a hydrogen sulfide generating agent are subjected to thermolysis in a biomass conversion unit. Some sulfur is thereby incorporated into the biomass. The temperature within the biomass conversion unit is between from about 250° C. to about 400° C. The amount of sulfur incorporated into the biomass prior to subjecting the bio-oil to hydrotreatment is between from about 1,000 ppm to about 8,000 by weight. The amount of carbonaceous material deposited onto the hydrotreater and/or the amount of polymers formed from unsaturated olefins after conversion of the biomass into bio-oil is less when the hydrogen sulfide or hydrogen sulfide generating agent is added to the biomass conversion unit than when the hydrogen sulfide or hydrogen sulfide generating agent is not added to the biomass conversion unit.

In another embodiment, a process for decreasing the requisite amount of hydrogen needed to deoxygenate bio-oil during hydrotreatment of bio-oil is provided. In this process, solid biomass and either hydrogen sulfide or a sulfiding agent are subjected to thermolysis in a biomass conversion unit to form a solid phase and a fluid phase. Bio-oil is separated from the fluid phase. The bio-oil is then subjected to hydrogenation in a hydrotreater to render deoxygenated renewable hydrocarbons. The requisite amount of hydrogen needed to treat the oxygenated oil in the hydrotreater is less when the hydrogen sulfide or sulfiding agent is present in the biomass conversion unit than when the hydrogen sulfide or sulfiding agent is not present in the biomass conversion unit.

Accordingly, the present disclosure includes features and advantages which are believed to increase the yield of liquid hydrocarbons and enhancing deoxygenation during conversion of biomass in a biomass conversion unit. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
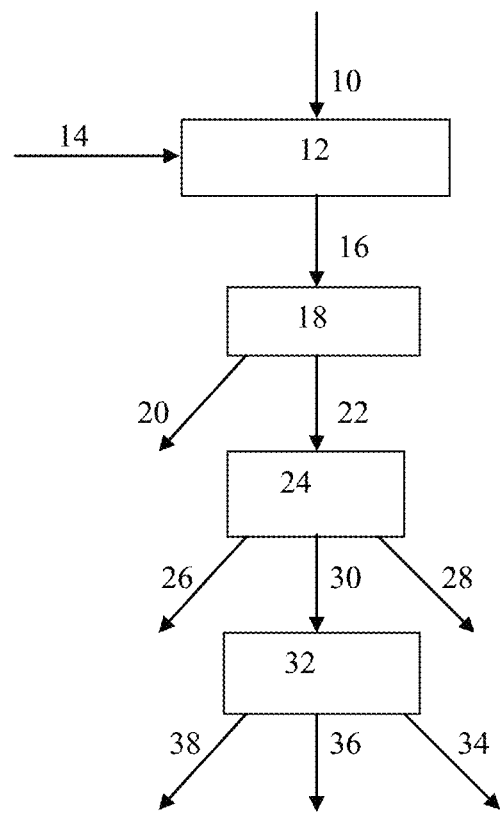
FIG. 1 is a schematic representation of a process defined herein wherein biomass is subjected to thermolysis in the presence of hydrogen sulfide or a sulfiding agent.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

Thermolysis of biomass in the presence of hydrogen sulfide and/or a sulfiding agent reduces the formation of deposits of unwanted carbonaceous materials (such as coke and light gas) in a biomass conversion unit as well as in separation units and hydrotreaters used in the production of renewable fuels.

In addition, the yield of renewable bio-oil (RBO) produced by a process wherein thermolysis is conducted in the presence of hydrogen sulfide and/or a sulfiding agent is increased. For instance, thermolysis of biomass in the presence of hydrogen sulfide and/or a sulfiding agent may increase the yield of produced RBO as much as 10% and in some cases as high as 30%.

Further, thermolysis of biomass in the presence of hydrogen sulfide and/or a sulfiding agent enhances deoxygenation of bio-oil in a hydrotreater. For instance, the amount of hydrogen required to hydrogenate the bio-oil is reduced when the oxygenated bio-oil is produced from the thermolysis of biomass in the presence of hydrogen sulfide and/or a sulfiding agent.

In the process disclosed herein, hydrogen sulfide and/or a sulfiding agent is added to a biomass conversion unit along with the biomass. Typically, biomass has low levels of sulfur, typically less than 200 ppm. When hydrogen sulfide or sulfiding agent is added to the biomass conversion unit, the formation of unwanted carbonaceous deposits or recombination products within the biomass conversion unit is reduced. Recombination products (such as pyrolytic lignin, tar, heavy hydrocarbons, etc.) typically contribute to the thermal instability of RBO. The storage and transport of RBO is thus adversely affected by the presence of recombination products.

Typically, the amount of hydrogen sulfide or sulfiding agent added to the biomass conversion unit is less than about 10,000 parts per million by volume (ppmv) relative to the lift gas, more typically less than about 4,000 ppmv (based on the total volume of gas in the biomass conversion unit). Typically, the optimum amount of sulfur added is about 2.6 weight percent of the biomass.

Sulfur is incorporated into the biomass during thermolysis. Sulfur incorporated into the biomass is removed in subsequent processing steps, such as those discussed below.

The sulfiding agent is preferably hydrogen sulfide, an organic sulfide (such as methyl sulfide), an organic disulfide (such as dimethyl disulfide or butyl disulfide), an organic polysulfide (such as polybutyl sulfide), a thiophene or a mixture thereof. The sulfiding agent may generate hydrogen sulfide in a homogeneous gaseous phase in the biomass conversion unit. The sulfiding agent may also be elemental sulfur.

Further, the amount of unwanted carbonaceous deposits or recombination products in the biomass conversion unit after thermolysis is less when the thermolysis is conducted in the presence of the added hydrogen sulfide or sulfiding agent than when hydrogen sulfide or sulfiding agent is not added to the biomass conversion unit. Thermolysis of biomass in the presence of hydrogen sulfide and/or the sulfiding agent in the biomass conversion unit decreases and/or inhibits polymerization of monomeric units, such as olefins. Such polymers are known to plug hydrotreaters and de-stabilize RBO. The formation of polymers in the hydrotreater (as well as in the biomass conversion unit) is also inhibited or curtailed by conducting thermolysis of the biomass in the presence of hydrogen sulfide or a sulfiding agent.

Exemplary reactors for the biomass conversion unit for use in the process disclosed herein are risers, fluidized bed reactors, cyclone reactors, ablative reactors, trickle bed configuration reactors as well as auger reactors. In a preferred embodiment, the biomass conversion unit is a fluidized bed reactor, a riser reactor or a fluidized catalytic cracking reactor having a riser.

Typically, the temperature in the biomass conversion unit is between from about 750° F. to about 1050° F. In some instances, the addition of hydrogen sulfide or sulfiding agent to the biomass conversion unit enables thermolysis to be conducted at a temperature about 15° F. higher without decreasing the liquid yield.

The biomass feedstock may be in the form of of finely divided particles. The biomass may also be a liquid. In an embodiment, the biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

The biomass feedstock may be provided to the biomass conversion unit via a biomass feed system. The feed system may be capable of feeding solid particulate biomass into the biomass conversion unit and performing any required pre-treatment (e.g. drying, roasting, torrefaction, demineralization, steam explosion, mechanical action, or a combination thereof) that facilitates subsequent conversion reactions. Exemplary mechanical action may include kneading, milling, crushing, extruding, chopping, or a combination thereof. Fluidizable particles may be produced from the heat treatment.

Any suitable heat exchange material (such as sand) or biomass conversion catalyst (BCC) may be used in the biomass conversion unit. When a BCC used it may be (i) a solid acid, such as a zeolite, super acid, clay, etc., (ii) a solid base, such as metal oxides, metal hydroxides, metal carbonates, basic clays, etc., (iii) a metal or a compound containing a metal functionality, such as Fe, Cu, Ni, and may include transition metal sulfides, transition metal carbides, etc., or (iv) an amphoteric oxide, such as alumina, silica, titania, etc. or a mixture of any of (i), (ii), (iii) or (iv). Preferably, the catalyst in biomass conversion unit 12 is a solid acid or base catalyst or a mixture thereof.

In a preferred embodiment, the BCC is a zeolite and may include those of the ZSM-type, including ZSM-5 (as disclosed in U.S. Pat. No. 4,490,566) and zeolite beta (disclosed in U.S. Pat. No. 4,490,565).

The effluent stream from the biomass conversion unit includes solids and fluid (e.g. gas and vapors). The solids may include a reduced amount, if any, of char or coke as well as spent and/or used BCC. The bio-oil produced from thermolysis conducted in the presence of hydrogen sulfide and/or sulfiding agent produces a more homogeneous fluid phase.

The solids and fluid stream from the effluent stream may then be separated. The fluid stream is substantially solids-free. The fluid stream is typically introduced into a fluids separator which separates out non-condensable gas (NCG), process water and an organic-enriched phase or bio-oil. (As used herein, the term "bio-oil" may refer to a complex mixture of several hundred organic compounds, such as lignin fragments, aldehydes, carboxylic acids, carbohydrates, phenols, furfurals, alcohols, and ketones.) Typically, the amount of bio-oil separated from the fluid phase is increased (enhanced) by the treatment of the biomass in the presence of the hydrogen sulfide or sulfiding agent in the biomass conversion unit.

Typically, the amount of hydrogen sulfide in the separated fluid phase is between from about 1,000 ppm to about 8,000 ppm by weight. Typically, about one third of the sulfur introduced into the biomass conversion is incorporated into the separated bio-oil.

The resulting bio-oil is then introduced into a hydrotreater to render renewable bio-oil (RBO). In the hydrotreater, the bio-oil containing stream is subjected to deoxygenation and desulfurization by the introduction of hydrogen. Hydrocarbons, water, and other by-products, such as hydrogen sulfide, are formed by hydrogenation of the bio-oil in the hydrotreater. Typically, the amount of oxygen remaining in the RBO is less than 2 weight percent and the amount of sulfur is less than 100 ppm, and preferably less than 10 ppm.

Hydrogenation is typically conducted in the presence of a catalyst. Where the hydrotreating catalyst contains sulfur (such as a metal sulfide), hydrogen introduced into the hydrotreater consumes a portion of the sulfur in the sulfur based catalyst. Typically therefore an external source of hydrogen sulfide and/or sulfiding agent is added to the hydrotreater in order to maintain the activity of catalyst. Typically, where a sulfur containing hydrogenation catalyst is used in the hydrotreater, the amount of sulfur typically needed in order to retain catalytic activity is between from about 100 to about 5,000 weight percent (based on the weight of the oxygenated bio-oil in the hydrotreater). In a preferred embodiment, the amount of sulfur added to the hydrotreater is about 0.2 weight percent based on the weight of the oxygenated bio-oil feed.

Since thermolysis is conducted in the presence of hydrogen sulfide or a sulfiding agent, it may be unnecessary to add an external feed of hydrogen sulfide and/or sulfiding agent into hydrotreater. If an external feed of hydrogen sulfide or sulfiding agent is needed, the amount required to be added to the hydrotreater is less than the amount which would be required had thermolysis not been conducted in the presence of the added hydrogen sulfide and/or sulfiding agent.

Sulfur from the hydrogen sulfide and/or sulfiding agent added to the biomass conversion unit for thermolysis is removed in the hydrotreater. The RBO typically meets current sulfur specifications for transportation fuels.

Hydrogen sulfide may further be regenerated during hydrogenation of the oxygenated bio-oil and may be recycled. For instance, hydrogen sulfide may be recycled as a purge gas stream into the biomass conversion unit or into the front end of the process. The amount of external hydrogen sulfide and/or sulfiding agent added to the biomass conversion unit may be reduced or eliminated by use of a purge gas stream.

Since thermolysis is conducted in the presence of hydrogen sulfide and/or sulfiding agent, the requisite amount of hydrogen needed to deoxygenate the bio-oil during hydrotreatment is reduced. This may also be attributable to the less oxygen being present in the bio-oil fed to the hydrotreater than in those instances where thermolysis was not conducted in the presence of hydrogen sulfide and/or sulfiding agent. Hydrogen sulfide can function as an oxygen acceptor in place of the hydrogen.

Referring to FIG. 1, in accordance with an embodiment of the present disclosure, biomass feedstream 10 is added to biomass conversion unit 12. Biomass conversion unit 12 may be a pyrolysis reactor or a catalytic thermolysis unit.

A stream of hydrogen sulfide or a sulfiding agent 14 may be added to biomass conversion unit 12. The sulfiding agent may generate hydrogen sulfide in a homogeneous gaseous phase in biomass conversion unit 12. In a preferred embodiment, biomass conversion unit 12 is a fluidized bed with a sulfide catalyst and further wherein hydrogen sulfide is generated in the biomass conversion unit from hydrogen and sulfur which, when passed over the fluidized bed, generates hydrogen sulfide.

The biomass feedstream may be fed from one or more external sources into biomass conversion unit 12. A biomass conversion catalyst (BCC) may be fed to biomass conversion unit 12, and mixed with the biomass feedstock. The bulk of the BCC catalyst is recycled solids from the reactor which has been thermal regenerated. The BCC may act as a heat source enabling the cracking of the biomass feedstock into smaller molecules. An additional supply of BCC may be mixed with the biomass feedstock in the biomass feed system and/or introduced directly into the biomass conversion unit 12 (e.g. the riser).

Referring still to the embodiment of FIG. 1, conversion effluent stream 16 which includes solids and fluid (e.g. gas and vapors) exits biomass conversion unit 12 and is introduced into solids separator 18. In solids separator 18, conversion effluent stream 16 is separated into solids at 20 and fluids in the conversion effluent. The solids may include char, coke and spent and/or used BCC. This solid can be calcined to remove the carbonaceous material and recycled to the reactor.

Fluid stream 22 exiting solids separator 18 is substantially solids-free and includes bio-oil. This fluid stream is introduced into fluids separator 24 where an organic-enriched phase 30 containing bio-oil is separated from non-condensable gas (NCG) 26 and process water 28.

The bio-oil containing oxygenates is then subjected to hydrotreatment. As illustrated in FIG. 1, organic-enriched phase 30 may be fed into hydrotreater 32 and subjected to deoxygenation with hydrogen present in the hydrotreater. Hydrocarbons, water, and other by-products, such as hydrogen sulfide, are formed in the hydrotreatment operation.

The resulting hydrotreated bio-oil stream may then be introduced into a fractionator and separated into naphtha fraction 34, bio-distillate fraction 36 and bio-gas oil fraction 38.

Figure 2:
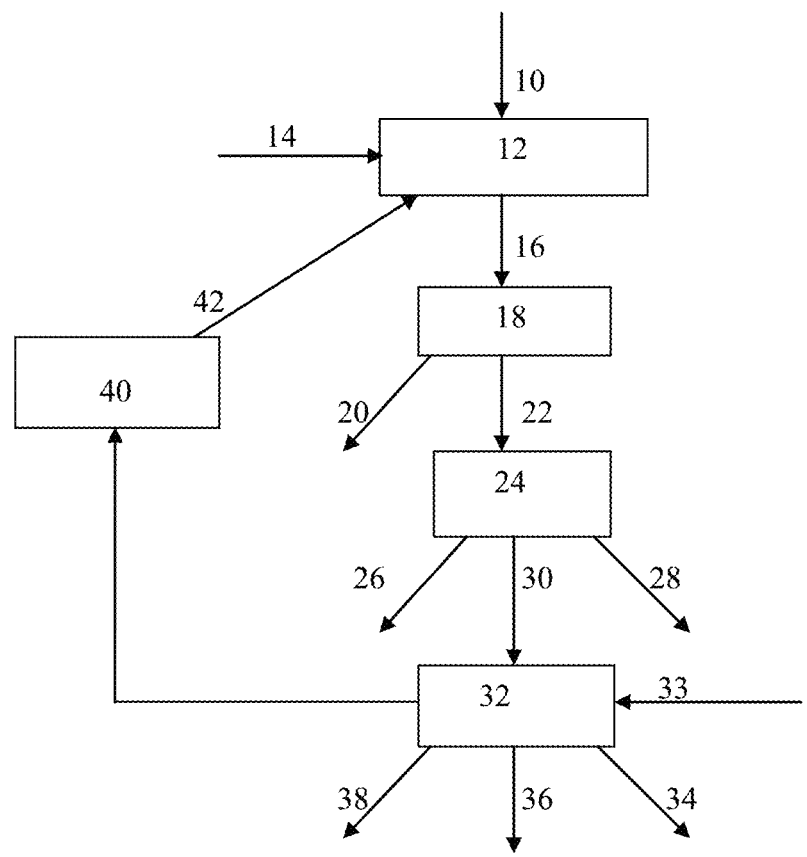
FIG. 2 is a schematic representation of a process defined herein wherein biomass is subjected to thermolysis in the presence of hydrogen sulfide from purge gas from the hydrotreater.

FIG. 2 (and FIG. 1) show hydrogen stream 33 being introduced into hydrotreater 32. Excess hydrogen is typically added during hydrogenation to quench the exothermic reaction. Most of this hydrogen is recycled along with the hydrogen sulfide.

Where the hydrotreating catalyst contains sulfur (such as a metal sulfide), hydrogen introduced into the hydrotreatment consumes a portion of the sulfur in the sulfur based catalyst. Typically therefore an external source of hydrogen sulfide and/or sulfiding agent is added to a hydrotreater in order to maintain the activity of catalyst. FIG. 2 shows hydrogen sulfide and/or a sulfiding agent being directly introduced into hydrotreater 32 through feedstream 42.

Referring to FIG. 2, gas from hydrotreater 32 may flow (instead of into a recycled reactor) into purge reactor 40. Hydrogen sulfide may then be separated and introduced into biomass conversion unit 12 as purge gas stream 42. Hydrogen in the purge gas may also be recycled to lift gas in the biomass conversion unit. The amount of external hydrogen sulfide and/or sulfiding agent added to biomass conversion unit 12 may be reduced or eliminated by use of purge gas stream 42.

All percentages set forth in the Examples are given in terms of weight units except as may otherwise be indicated.

EXAMPLES

A lignocellulosic biomass was subjected to thermolysis in the presence of a zeolitic and clay containing catalyst in a fluidized bed thermocatalytic biomass conversion unit wherein the lignocellulosic material was converted into a bio-oil containing feedstream. Nitrogen was used as a lift gas. Hydrogen sulfide was injected into lift gas wherein (in different runs), the amount of hydrogen sulfide injected was 1750 ppmv, 3500 ppmv and 7000 ppmv relative to the nitrogen. The hydrogen sulfide comprised 0.6, 1.2 and 2.4 weight percent relative to the biomass feed. In addition, a control run using no hydrogen sulfide was conducted. For the stated injection amounts of hydrogen sulfide and the control, thermolysis was conducted at three riser outlet temperatures—800° F., 913° F. and 1000° F.—for one hour followed by a 2 hour run at 913° F. in order to allow for hydrogen sulfide equilibration. Solids and bio-oil were separated from the converted biomass. For the control and each injection test, the sulfur balance in the bio-oil was determined as set forth in Table I below:

TABLE I

| Amt of Injected Hydrogen Sulfide, ppm | Sulfur Balance, Wt % |
| --- | --- |
| Control | 93.0 |
| 1750 | 55.2 |
| 3500 | 56.7 |
| 7000 | 80.0 |

Figure 3:
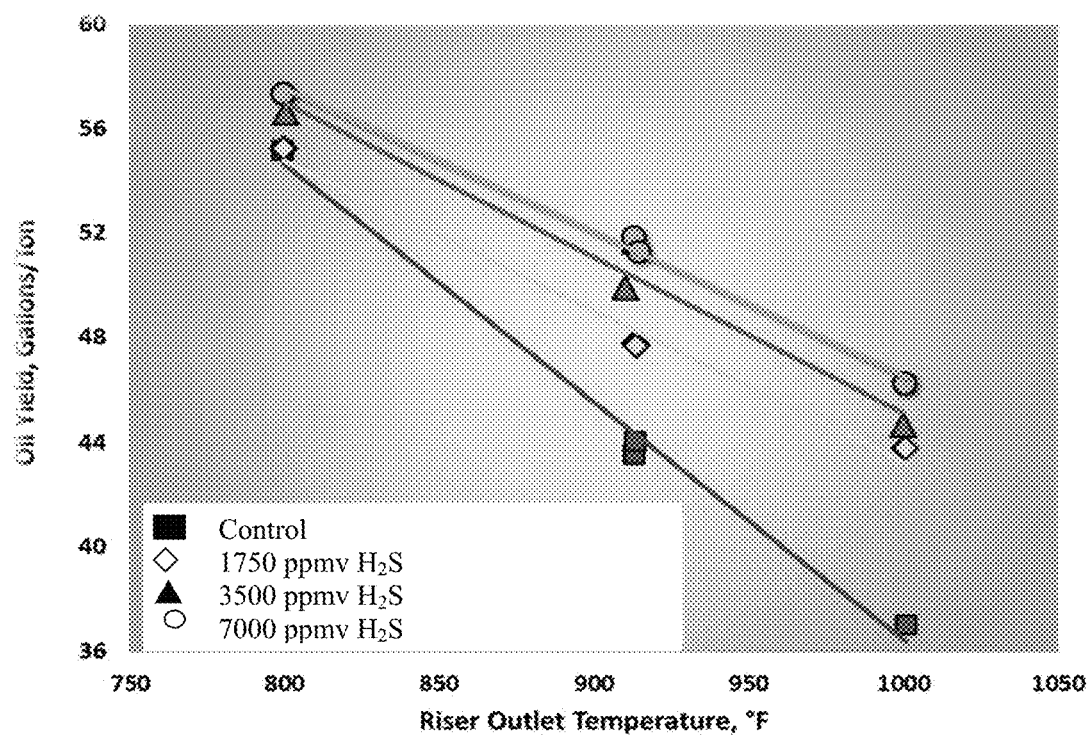
FIG. 3 illustrates the effect of temperature on the increase in yield of renewable hydrocarbons produced by a process defined herein.

The weight percent of oxygen in the bio-oil was determined and the results are graphically set forth in FIG. 3. The lowest yield of bio-oil produced corresponds to the higher oxygen levels in the bio-oil. FIG. 3 illustrates that the yield of bio-oil correlates to the temperature in the biomass conversion unit during thermolysis. Thermolysis at more elevated temperatures is desirable because less oxygenates are produced at higher temperatures. The addition of hydrogen sulfide or a sulfiding agent to the biomass conversion unit allows thermolysis to be conducted under more severe conditions, longer contact times and higher temperatures.

Increased yield is also seen to be attributed to increasing hydrogen sulfide in the biomass conversion unit during thermolysis. This is particularly true at 1000° F. with 7000 ppmv hydrogen sulfide where the yield of liquid increased 36.5 gallons per ton of biomass to 47.5 gallon per ton. The increase yields at lower temperature were lower but still significant.

Figure 4:
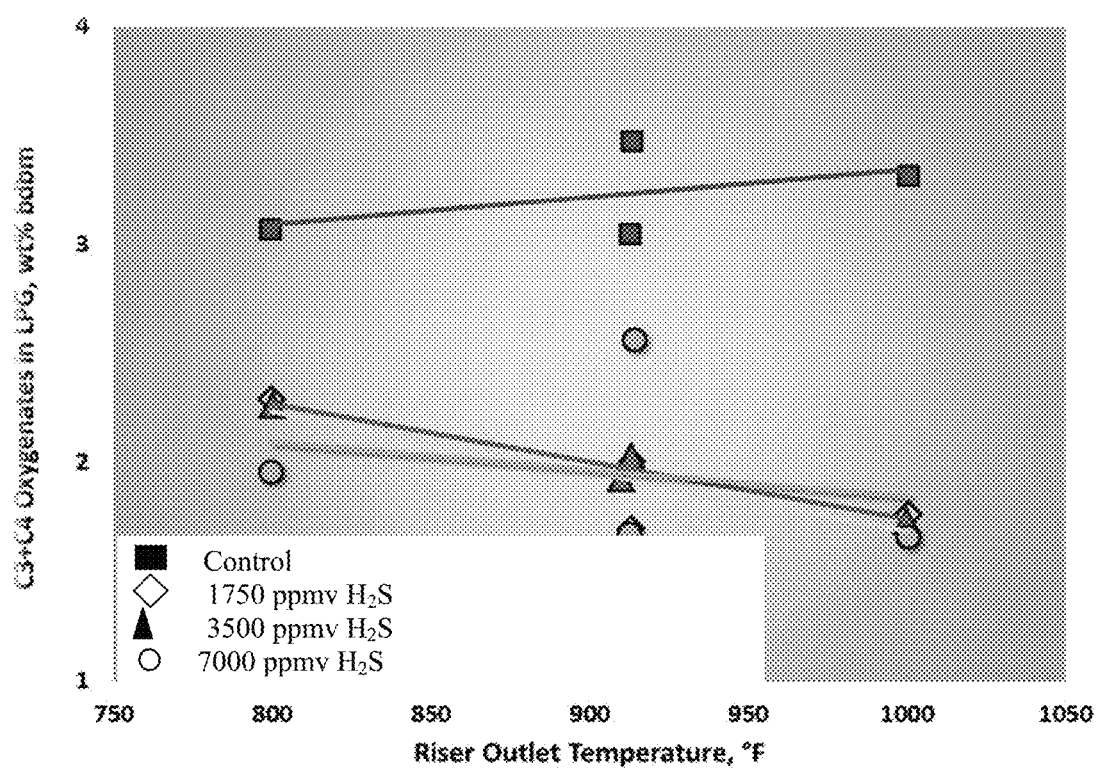
FIG. 4 illustrates the amount of light oxygenates produced by thermolysis of biomass in the presence of hydrogen sulfide or sulfiding agent.

The weight percent bone dry ash free biomass (bdbm) in light gases (principally propane and butane) was determined for each of the runs and the results are set forth in FIG. 4. FIG. 4 demonstrates that the weight percent of light gases increases with the control but remains relatively unchanged or lower when thermolysis is conducted in the presence of hydrogen sulfide. Light gases are typically difficult to remove from bio-oil. The yield of refined bio-oil is enhanced by conducting thermolysis in the presence of hydrogen sulfide or a sulfiding agent since the production of light gases has been decreased.

Figure 5:
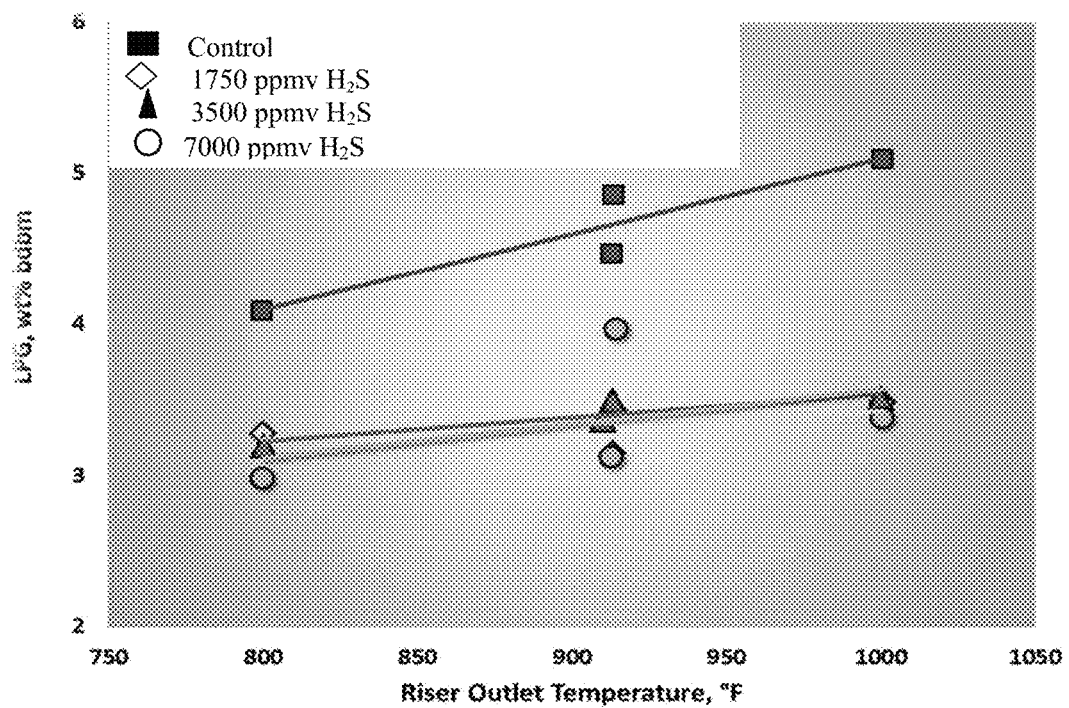
FIG. 5 illustrates the amount of LPG compounds produced in a biomass conversion unit in the presence of hydrogen sulfide or sulfiding agent.

The amount of low molecular weight oxygenates 4 or less carbon atoms in the LPG was measured and the results are set forth in FIG. 5. The presence of low molecular weight oxygenates produces bio-oil of low quality. FIG. 5 demonstrates that the amount of low molecular weight oxygenates increases with increasing riser outlet temperatures in the control but decreases with increasing riser outlet temperatures when thermolysis is conducted in the presence of hydrogen sulfide. In addition, FIG. 5 illustrates that the amount of low molecular weight oxygenates decreases with increasing amounts of hydrogen sulfide injected into the biomass conversion unit. The decrease in LPG is also demonstrated through the reduction in low molecular weight oxygenates with increasing levels of hydrogen sulfide.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A process for increasing the yield of liquid hydrocarbons and enhancing deoxygenation during conversion of biomass in a biomass conversion unit, the process comprising:
   (a) generating fluidizable particles from the biomass and combining the fluidizable particles with hydrogen sulfide or a sulfiding agent in a lift gas;
   (b) combining the lift gas with a hot heat transfer medium or catalyst; and
   (c) subjecting the biomass and the hydrogen sulfide or sulfiding agent to thermolysis in the biomass conversion unit and incorporating sulfur into the biomass
   wherein the amount of hydrogen sulfide or sulfiding agent in the biomass conversion unit is less than or equal to 8,000 parts per million by volume (ppmv) relative to the volume of the lift gas and further wherein the amount of liquid hydrocarbons produced is greater than when the hydrogen sulfide or sulfiding agent is not added to the biomass conversion unit.

2. The process of claim 1, wherein the sulfiding agent is selected from the group consisting of hydrogen sulfide, organic sulfides, organic disulfides, organic polysulfides, thiophenes and mixtures thereof.

3. The process of claim 2, wherein the sulfiding agent is selected from the group consisting of dimethyl disulfide, methyl sulfide, butyl disulfide, polybutyl sulfide and mixtures thereof.

4. The process of claim 1, wherein a solid phase and a fluid phase are separated from the product of step (c) and further wherein the amount of sulfur in the fluid phase is between from about 1,000 parts per million (ppm) to about 8,000 by weight.

5. The process of claim 1, wherein the biomass conversion unit is a pyrolysis reactor.

6. The process of claim 1, wherein the biomass conversion unit is a catalytic thermolysis unit.

7. The process of claim 6, wherein the catalyst in the catalytic thermolysis unit is a solid acid or base catalyst or a mixture thereof.

8. The process of claim 6, wherein the catalyst in the catalytic thermolysis unit contains zeolite.

9. The process of claim 6, wherein the catalyst contains ZSM-5.

10. The process of claim 1, wherein the biomass conversion unit is a riser, a fluidized bed reactor, a cyclone reactor, an ablative reactor, a trickle bed configuration reactor or an auger reactor.

11. The process of claim 1, wherein the biomass conversion unit is a fluidized bed reactor or a riser reactor.

12. The process of claim 3, wherein the sulfiding agent is passed over a catalyst bed within the biomass conversion unit to generate hydrogen sulfide.

13. The process of claim 1, wherein hydrogen sulfide is added to the biomass in the biomass conversion unit and further wherein at least a portion of the hydrogen sulfide added to the biomass is recycled from a hydrotreater.

14. A process of enhancing the yield of bio-oil by the conversion of solid biomass to hydrocarbons in a biomass conversion unit, the process comprising:
   (a) subjecting the solid biomass and either hydrogen sulfide or a sulfiding agent to thermolysis in a biomass conversion unit;
   (b) separating the converted biomass from step (a) into a fluid phase and a solid phase;
   (c) separating the fluid phase into a non-condensable gas phase, bio-oil and process water; and
   (d) subjecting the bio-oil to hydrogenation in a hydrotreater to render renewable hydrocarbons with an oxygen content of less than 2 weight percent
   wherein the yield of oil recovered from the hydrotreater is greater when the hydrogen sulfide or sulfiding agent is present in the biomass conversion unit in step (a) than when the hydrogen sulfide or sulfiding agent is not present.

15. The process of claim 14, wherein the amount of hydrogen sulfide or sulfiding agent added to the biomass conversion unit is less than about 10,000 ppm.

16. The process of claim 15, wherein the amount of hydrogen sulfide or sulfiding agent added to the biomass conversion unit is less than about 4,000 ppm.

17. The process of claim 14, wherein the bio-oil added to the hydrotreater in step (d) has between from about 1,000 to about 8,000 by weight of incorporated sulfur.

18. The process of claim 14, wherein the bio-oil having the incorporated sulfur is subjected to hydrotreatment in step (d) without further addition of sulfur or a sulfiding agent to the hydrotreater.

19. The process of claim 14, wherein the biomass is fed into the biomass conversion unit with hydrogen sulfide and further wherein the hydrogen sulfide fed into the biomass conversion unit includes purge gas generated in the hydrotreater.

20. The process of claim 14, wherein the temperature in the biomass conversion unit is between from about 250° C. to about 400° C.

21. The process of claim 14, wherein the sulfiding agent generates hydrogen sulfide in a homogeneous gaseous phase in the biomass conversion unit.

22. The process of claim 14, wherein the yield of liquid in the biomass conversion unit after step (a) is greater than the yield of liquid in the biomass conversion unit when the solid biomass is not subjected to hydrogen sulfide or a sulfiding agent at the same temperature.

23. The process of claim 14, wherein the amount of liquid in the biomass conversion unit after step (a) is greater than the amount of liquid in the biomass conversion unit when the solid biomass is not subjected to hydrogen sulfide or a sulfiding agent at the same level of deoxygenation.

24. The process of claim 14, wherein the amount of unwanted carbonaceous deposits or recombination products in the biomass conversion unit after step (a) is less when the hydrogen sulfide or sulfiding agent is added to the biomass conversion unit than when the hydrogen sulfide or sulfiding agent is not added to the biomass conversion unit.

25. The process of claim 14, wherein the amount of recombination product formation in the biomass conversion unit after step (a) is less when the hydrogen sulfide or sulfiding agent is added to the biomass conversion unit than when the hydrogen sulfide or sulfiding agent is not added to the biomass conversion unit.

26. The process of claim 14, wherein hydrogen sulfide and the solid biomass are subjected to thermolysis in the biomass conversion unit and further wherein at least a portion of the hydrogen sulfide is recycled from the hydrotreater.

27. A process of enhancing the yield of bio-oil from the conversion of solid biomass to hydrocarbons in a biomass conversion unit comprising:
   (a) subjecting (i) biomass; and (ii) less than about 4,000 ppmv hydrogen sulfide or a hydrogen sulfide generating agent to thermolysis in a biomass conversion unit and incorporating sulfur into the biomass, wherein:
      (i) the temperature within the biomass conversion unit is between from about 250° C. to about 400° C.; and
      (ii) the amount of sulfur incorporated into the biomass after step (a) is between from about 1,000 ppm to about 8,000 by weight; and
   (b) subjecting bio-oil originating from the biomass conversion unit in step (a) to hydrotreatment
   wherein the amount of carbonaceous material deposited onto the hydrotreater and/or the amount of polymers formed from unsaturated olefins after conversion of the biomass into bio-oil is less when the hydrogen sulfide or hydrogen sulfide generating agent is added to the biomass conversion unit than when the hydrogen sulfide or hydrogen sulfide generating agent is not added to the biomass conversion unit.

28. The method of claim 27, wherein the biomass conversion unit is a fluidized bed with a sulfide catalyst and further wherein the hydrogen sulfide generating agent is hydrogen or sulfur which, when passed over the fluidized bed, generates hydrogen sulfide.

29. The process of claim 27, wherein hydrogen sulfide and the solid biomass are subjected to thermolysis in the biomass conversion unit and further wherein at least a portion of the hydrogen sulfide is recycled from a hydrotreater.

30. A process for decreasing the requisite amount of hydrogen needed to deoxygenate bio-oil during hydrotreatment, the process comprising:
   (a) subjecting solid biomass and either hydrogen sulfide or a sulfiding agent to thermolysis in a biomass conversion unit to form a solid phase and a fluid phase;
   (b) separating bio-oil from the fluid phase;
   (c) introducing the bio-oil and hydrogen into a hydrotreater and producing deoxygenated renewable hydrocarbons by subjecting the bio-oil to hydrogenation in the hydrotreater
   wherein the amount of hydrogen needed to de-oxygenate the bio-oil in the hydrotreater is less when the hydrogen sulfide or sulfiding agent is present in the biomass conversion unit in step (a) than when the hydrogen sulfide or sulfiding agent is not present.

31. The process of claim 30, wherein hydrogen sulfide is added to the biomass in the biomass conversion unit and further wherein at least a portion of the hydrogen sulfide added to the biomass is recycled from the hydrotreater.

* * * * *